Dec. 6, 1938.   L. GITZENDANNER   2,138,853
THERMOSTATIC MIXING VALVE
Filed Aug. 10, 1937
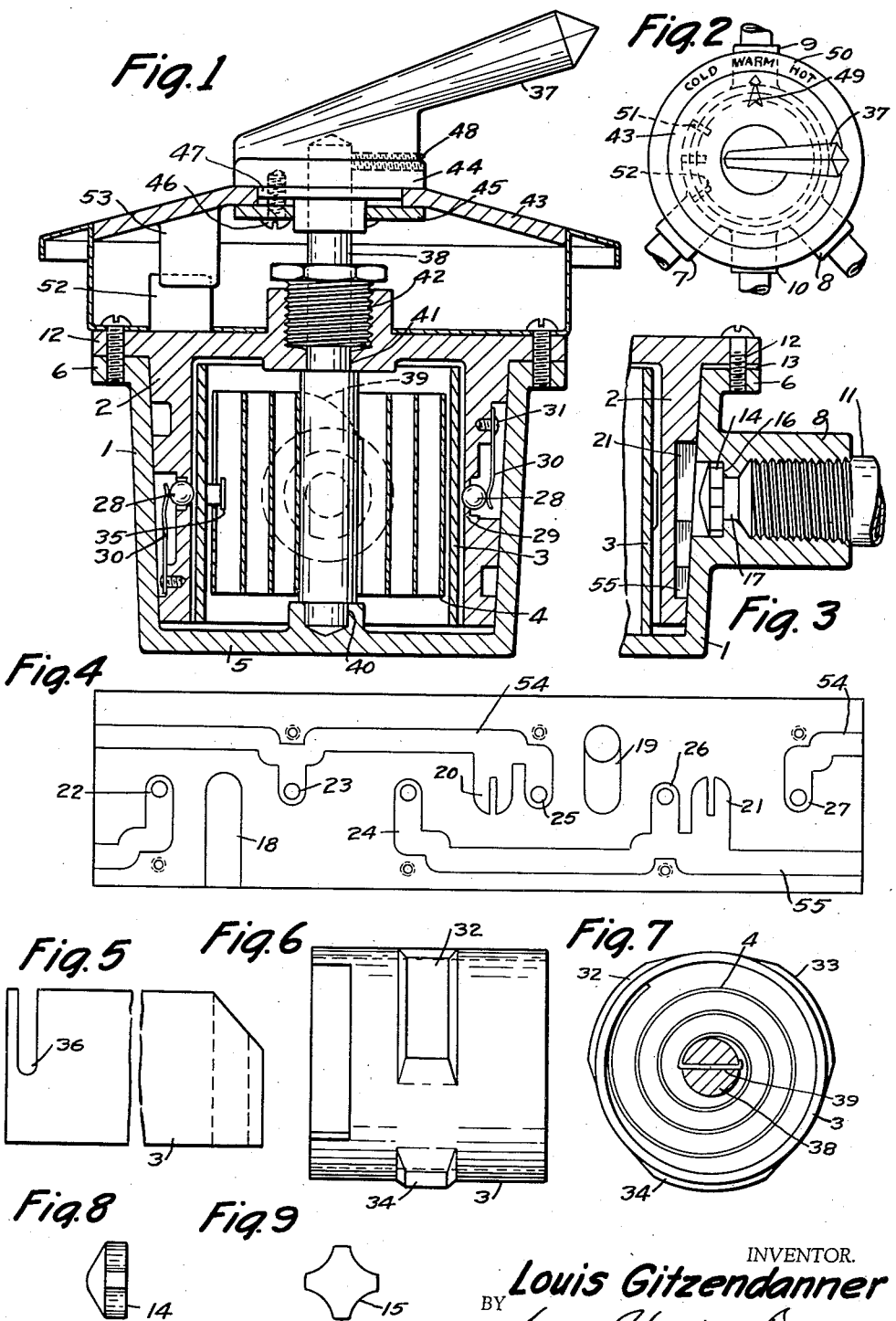
INVENTOR.
Louis Gitzendanner
BY James Harrison Bowen
ATTORNEY.

Patented Dec. 6, 1938

2,138,853

UNITED STATES PATENT OFFICE 2,138,853

THERMOSTATIC MIXING VALVE

Louis Gitzendanner, Richmond Hill, N. Y.

Application August 10, 1937, Serial No. 158,284

1 Claim. (Cl. 236—12)

The purpose of this invention is to provide a thermostatically controlled mixing valve, in which a thermostatically controlled floating element contacts opening and closing means in orifices between passages, thereby reducing the work performed by the thermostatically controlled element to a minimum, and assuring satisfactory and continuous operation thereof.

The invention is a thermostatic valve for mixing fluids at different temperatures, in which the fluids are contained in internal passages in the valve casing, and the passages are provided with orifices having resiliently held members, which are operated to open and close the orifices by a floating member having cam surfaces which is moved by expansion and contraction of the thermostatic or bimetal element.

Other devices of this nature, for mixing hot and cold water, have been provided having elements operated by thermostatic material, however, these devices have not provided means for balancing the valve member, and any type of sliding valve requires too much force to be operated by a thermostatic element as the movement of the thermostatic element is very delicate, or, in fact, any type of sliding valve does not positively shut off or seal sufficiently for a valve of this type, so that it is necessary that the members operated by the thermostatic element move with very little effort, and form an absolute seal. This device, therefore, contemplates the use of cam surfaces operated by the thermostatic element, and engaging resiliently held members forming valves or closures. These devices have also been comparatively large and, therefore, objectionable, and have also been comparatively costly so that they have not been adapted universally. Many other devices have been provided that are mechanically operated, however, in any of these devices it is impossible to obtain water at a given temperature when the temperatures of the hot and cold water supplies vary.

The object of this invention is, therefore, to provide a thermostatically controlled mixing device, which is particularly adapted for mixing hot and cold water, and automatically regulating the temperature thereof, in which the closures for the water at different temperatures are operated with the least possible force.

Another object is to provide a mixing valve for fluids at different temperatures, in which a thermostatically controlled element opens and closes valves therein.

Another object is to provide a device having a plurality of internal passages, with balls held by springs in openings from said passages, in which means is provided for moving the balls to open the passages, which is controlled by the temperature of the mixing fluid.

Another object is to provide a thermostatic mixing valve which may readily be installed in a wall, fixture, or in combination with any device.

Another object is to provide a thermostatic mixing valve, in which the parts thereof may readily be removed and replaced.

A further object is to provide a thermostatic mixing valve, in which the wearing parts are reduced to a minimum.

And a still further object is to provide a thermostatic mixing valve, which is of a simple and economical construction.

With these ends in view the invention embodies a valve casing having hot and cold water inlet connections at the sides, an outlet connection or connections, a stationary sleeve having a tapering outer surface corresponding with the similar surface in the casing, and having recesses therein, a movable floating sleeve inside of the stationary sleeve having cam surfaces on the outer surface thereof, resiliently held members in orifices communicating with the recesses in said stationary sleeve, and contacting said cam surfaces, a thermostatic element connected to the movable sleeve, and also connected to a centrally positioned rod, and a pointer at the end of the rod and on the outside of the casing adapted to be set to different points indicating temperatures.

Other features and advantages of the invention will appear from the following description taken in connection with the drawing, wherein:

Figure 1 is a view showing a vertical cross-section through the valve with the handle shown in elevation.

Figure 2 is a plan view on a reduced scale.

Figure 3 is a section showing one of the inlet connections.

Figure 4 is a diagrammatic view showing the outer surface of the inner stationary conical-shaped member, showing the arrangement of the recesses or passages therein.

Figure 5 is a view showing the thermostatic or bimetal element open to a flat position with part broken away.

Figure 6 is a view showing a side elevation of the floating cam sleeve.

Figure 7 is a plan view of the sleeve shown in Figure 6, also showing the thermostatic element and central post, with the post shown in section.

Figure 8 is a detail showing a check valve element which is used in the inlet connections.

Figure 9 is an end elevation of the element shown in Figure 8.

In the drawing the device is shown as it may be made, wherein numeral 1 indicates the outer casing, numeral 2 the inner stationary cylinder, numeral 3 the floating cam sleeve, and numeral 4 the thermostatic or bimetal element.

The outer casing 1 is preferably of a cup-shape, with a closed base 5, a flange 6 around the upper edge and bosses 7 and 8 forming inlet connections, and other bosses 9 and 10 forming outlet connections, pipes, as indicated by the numeral 11, may be threaded into these bosses, and extended to various points for supplying liquid to the valve and carrying it therefrom.

The inner surface of the casing 1 is of a conical or tapering shape, and the outer surface of the stationary member 2 is correspondingly shaped so that one fits snug in the other, thereby sealing the spaces between passages in the outer surface of the member 2. The member 2 is also provided with a flange 12 corresponding with the flange 6, so that the two members may be bolted together and secured as shown in Figure 1, however, it will be understood that a gasket 13 may be used between the flanges if desired as shown in Figure 3. The inlet connections from the bosses 7 and 8 are provided with check washers 14 as shown in Figures 8 and 9, and the edges of these washers are provided with indentations 15 which permit liquid to flow past the washers, with the washers moved away from the seats 16 shown in Figure 3, it being noted that the root or inside diameter of the recesses is larger than the internal opening 17 of the seat 16, thereby making it possible to form a closure with the member seated, and permitting fluid to flow by the washer when it is unseated.

The outer surface of the member 2 is provided with recesses as shown in Figure 4, and it will be noted that, in the diagram, the recess 18 corresponds with the boss 9 at the back, the recess 19, with the boss 10 at the front, the recess 20 with the inlet connection 7, and the recess 21 with the inlet connection 8, and between these connections are recesses 22, 23, 24, 25, 26 and 27, each of which is provided with balls 28 held against seats 29 by springs 30 secured in position by screws 31, and the balls extend through the inner wall of the member 2, and are positioned to engage cam surfaces 32, 33 and 34 on the outer surface of the inner floating cam sleeve 3; and it will be noted that the sleeve 3 is turned by the expansion and contraction of the thermostatic element 4, which is secured thereto by a screw 35 in a slot 36, and the position of the thermostatic element and sleeve 3 may be adjusted by a handle 37 mounted on the upper end of a vertical shaft 38, which extends downward through the casing, the lower part being provided with a slot 39 in which the inner end of the thermostatic element 4 is mounted, as shown in Figure 7. The shaft is mounted in a bearing 40 in the center of the casing 1, with the upper part held in a bearing 41 in the top of the member 2, and this bearing is provided with a packing gland 42 which prevents leakage therethrough. At the upper end of the shaft is a disc 43, which is clamped to the shaft through the base 44 of the handle 37, by a washer 45 having screws 46 extending therethrough and into the base 44, and the base is also provided with a shoulder 47 corresponding with the opening in the center of the disc. The handle 37 is secured to the upper end of the shaft 38 by a set screw 48.

The disc 43 is provided with an arrow 49, as shown in Figure 2, which may be set by the handle 37 to correspond with the words "Cold", "Warm", or "Hot" on the outer surface of a thin metal cup-shaped collar 50, which may be secured to the upper end of the valve, or located on the outside of a wall or other surface, in which the valve may be mounted. The upper surface of the member 2 is provided with lugs 51 and 52, and a corresponding lug 53, extending downward from the disc 43 between the lugs 51 and 52, limits the movement of the handle 37, and it will be noted that any slight movement of the handle adjusts the position of the sleeve 3 to regulate the temperature of the water or other fluid in the valve. As this member moves, the cam surfaces engage the balls 28, thereby opening the orifices of the passages and permitting fluids from the inlets 20 and 21 to flow through the orifices into the central part of the valve, the said orifices being connected by communicating passages 54 and 55 at the upper and lower parts of the member 2. It will be understood that these passages may be located at any other point or points, or arranged in any other manner, in order to obtain the proper mixing of any desired fluids for which the valve may be used. It will also be understood that the inlet and outlet connections may be located at any other point or points, and any number of connections may be provided.

It will be understood that other changes may be made in the construction without departing from the spirit of the invention. One of which changes may be in the use of other means for locating and connecting the outer or exposed disc or plate to the valve casing, as this disc may be separated therefrom, another may be in the use of other means for providing resilient valves in the orifices, and still another may be in the use of other means for mounting any of the parts.

The construction will be readily understood from the foregoing description. In use this device, when used for mixing hot and cold water, may be installed in the piping before the tap, and may be set to provide a resulting fluid of substantially any temperature, and, although it has been shown and described as adapted for hot and cold water, it will be understood that it may be used for other fluids for other purposes.

Having thus fully described the invention, what I claim as new and desire to secure by Letters Patent is:

A fluid mixing valve for fluids of different temperatures comprising a receptacle forming a casing and having inlet and outlet connections, an inner stationary member forming a lining for said casing, said inner stationary member characterized in that the outer surface thereof which engages the inner surface of the casing is recessed with a plurality of overlapping passages, with one passage communicating with an inlet connection, and one with an outlet connection, and with orifices at a plurality of points in said recesses providing communicating means between the recesses and interior of the said stationary member, resiliently held balls forming closures for said orifices and projecting therethrough, a floating sleeve separated from said stationary member and having a series of cam surfaces on the outer surface thereof positioned to engage the said balls to open said orifices, and a thermostatic element positioned in the path of the mixed fluids controlling the rotation of said sleeve.

LOUIS GITZENDANNER.